United States Patent
Ono

Patent Number: 6,137,406
Date of Patent: Oct. 24, 2000

[54] DOUBLE SUPERHETERODYNE TYPE MICROWAVE DETECTOR CAPABLE OF DETECTING LEAKED MICROWAVES

[75] Inventor: Hisao Ono, Tokyo, Japan

[73] Assignee: Yupiteru Industries Co., Ltd., Japan

[21] Appl. No.: 09/399,440

[22] Filed: Sep. 17, 1999

[30] Foreign Application Priority Data

Sep. 24, 1998 [JP] Japan .................................. 10-269418

[51] Int. Cl.[7] .................................................... G08B 13/26

[52] U.S. Cl. ......................... 340/552; 342/20; 342/100; 342/99; 455/227; 455/207; 455/208; 455/209

[58] Field of Search ............................... 340/552; 342/20, 342/100, 99; 455/227, 207, 208, 209, 314, 315, 161.2, 165.1

[56] References Cited

U.S. PATENT DOCUMENTS 5,268,689  12/1993  Ono et al. .................................. 342/20
5,461,383  10/1995  Ono et al. .................................. 342/20

*Primary Examiner*—Daniel J. Wu
*Assistant Examiner*—Tai T. Nguyen
*Attorney, Agent, or Firm*—Marger Johnson & McCollom, P.C.

[57] ABSTRACT

A double superheterodyne type microwave detector is constructed from a reception antenna; a first local oscillator; a second local oscillator; reception means for detecting microwaves having prescribed frequencies based on signals obtained by carrying out a first mixing in which the output of the first local oscillator is mixed with the microwaves picked up by the antenna, and a second mixing in which the signals obtained from the first mixing are mixed with the output of the second local oscillator; judgement means for judging whether or not an actual microwave signal which forms a detection target has been detected by the reception means; alarm means for outputting an alarm when the judgement means judges an actual microwave signal to have been received by the reception means; and first control means for suspending the first mixing when the reception means detects a microwave signal having a prescribed frequency; wherein the judgement of whether or not the prescribed frequency microwave signal detected by the reception means is an actual microwave signal is carried out based on information obtained by the judgement means after the first mixing is suspended.

9 Claims, 11 Drawing Sheets

DOUBLE SUPERHETERODYNE TYPE MICROWAVE DETECTOR CAPABLE OF DETECTING LEAKED MICROWAVES

BACKGROUND OF THE INVENTION

1. Field of the Invention

The present invention relates to a microwave detector, and in particular relates to a double superheterodyne type microwave detector equipped with a first local oscillator and a second local oscillator.

2. Description of the Prior Art

Microwave detectors which generate an alarm upon detecting microwaves having the specific microwave frequencies emitted by radar type speed measurement devices are known in the prior art. Omitting a detailed description of the circuit construction, such microwave detectors generally operate by means of an antenna which picks up microwaves arriving from outside, and a superheterodyne type receiver circuit which receives microwave signals. Further, by sweeping the output of the local oscillator in the related receiver circuit over a prescribed frequency range, such microwave detectors are able to ensure that the reception band width includes the microwave frequency of the detection target. Further, the local oscillator repeatedly carries out only a single sweep of the frequencies within the reception band width for each operation time period.

At this time, the receiver circuit outputs a microwave frequency within the reception band width and two peaks within a prescribed time interval t. Now, because the microwave frequency of the detection target is fixed for the time interval t, the presence or absence of a detection target microwave frequency can be determined by whether or not a pair of peaks are present within the time interval t. In other words, when a signal having the same frequency as the target microwave frequency is received, an alarm is generated.

In this connection, in one type of prior art microwave detector, a fixed frequency oscillator is used in a first local oscillator, and a double superheterodyne type sweeping oscillator is used in a second local oscillator.

In such a prior art microwave detector, because the second local oscillator is made to carry out a sweeping operation, the first intermediate frequency forms a wide band. As a result, there is a widening of the pass band in the intermediate frequency amplifier (band pass filter+amplifier) connected at the step following the first mixer, and this creates the risk that microwave signals near the periphery will leak into such intermediate frequency amplifier.

Namely, the microwave signals that leak into the intermediate frequency amplifier will be amplified as if they were inside the pass band, and then such amplified signals will be inputted into the second mixer. Consequently, in the case where the frequency of such microwave signals matches the output of the first local oscillator for actual target microwaves, it becomes impossible for the circuit arranged after the second mixer to discriminate whether such microwave signals are signals related to actual microwave signals received from the antenna or microwave signals which have leaked into the intermediate frequency amplifier.

Accordingly, when such microwaves leak into the intermediate frequency amplifier, they will be mistakenly interpreted as actual microwave signals, and this will result in the generation of false alarms. In other words, the interference generated by such microwave signals causes the detection accuracy of the microwave detector to be lowered.

Furthermore, this problem is widespread due to the fact that microwaves are emitted by various electronic devices and portable communication devices mounted in the vehicle equipped with the microwave detector or carried into the inside of the compartment thereof. Accordingly, due to the reception of such microwave interference, the generation of false alarms is quite common.

SUMMARY OF THE INVENTION

With a view toward overcoming the problems of the prior art described above, it is an object of the present invention to provide a microwave detector which makes it possible to prevent as much as possible the generation of false alarms due to microwave interference in the intermediate frequency band being misjudged as the reception of actual microwave signals.

In order to accomplish the object stated above, in one embodiment of the present invention, a double superheterodyne type microwave detector is constructed from a reception antenna; a first local oscillator; a second local oscillator; reception means for detecting microwaves having prescribed frequencies based on signals obtained by carrying out a first mixing in which the output of the first local oscillator is mixed with the microwaves picked up by the antenna, and a second mixing in which the signals obtained from the first mixing are mixed with the output of the second local oscillator; judgement means for judging whether or not an actual microwave signal which forms a detection target has been detected by the reception means; alarm means for outputting an alarm when the judgement means judges an actual microwave signal to have been received by the reception means; and first control means for suspending the first mixing when the reception means detects a microwave signal having a prescribed frequency; wherein the judgement of whether or not the prescribed frequency microwave signal detected by the reception means is an actual microwave signal is carried out by the judgement means based on a detected wave output outputted from the reception means after suspension of the first mixing. This invention relates to the first embodiment of the present invention.

In another embodiment of the present invention, a double superheterodyne type microwave detector is constructed from a reception antenna; a first local oscillator; a second local oscillator; reception means for detecting microwaves having prescribed frequencies based on signals obtained by carrying out a first mixing in which the output of the first local oscillator is mixed with the microwaves picked up by the antenna, and a second mixing in which the signals obtained from the first mixing are mixed with the output of the second local oscillator; judgement means for judging whether or not an actual microwave signal which forms a detection target has been detected by the reception means; alarm means for outputting an alarm when the judgement means judges an actual microwave signal to have been received by the reception means; and first control means for suspending the first mixing when the reception means detects a microwave signal having a prescribed frequency; wherein the judgement of whether or not the prescribed frequency microwave signal detected by the reception means is an actual microwave signal is carried out by the judgement means based on information outputted from the reception means after suspension of the first mixing, and information outputted from the reception means before suspension of the first mixing.

Namely, in the case where the first local oscillator is in an operating mode with the output thereof undergoing frequency mixing (i.e., when the first mixing is being carried out), a detected wave output indicating that a prescribed frequency microwave signal from the reception means has been detected will be generated regardless of whether such prescribed frequency microwave signal is due to an actual microwave signal or microwave interference. However, in the case where the detected wave output is due to an actual microwave signal undergoing mixing with the output of the first local oscillator, if the first mixing is suspended by the control means, the detected wave output due to the actual microwave signal will disappear. On the other hand, in the case where the detected wave output is due to microwave interference, the reception means will continue to output the detected wave output even when the control means suspends the first mixing.

Accordingly, in the invention after a prescribed frequency microwave signal has been received while the first mixing is being carried out, the first mixing is suspended, and in the case where there is no detected wave output during the suspension of the first mixing, the previous detected wave output is judged to be due to an actual microwave signal.

Further, in the invention if there is no change in the reception state before and after suspension of the first mixing, the previous detected wave output is judged to be due to microwave interference, but in the case where the reception state changes (in a direction toward a state in which no reception signals are received), the previous detected wave output is judged to be due to an actual microwave signal.

Further, the invention can be constructed so that the reception means outputs information in the form of detected wave outputs, and the judgement means judges an actual microwave signal to have been received when a prescribed frequency microwave signal is detected before suspension of the first mixing and no prescribed microwave signals are detected after suspension of the first mixing. This invention relates to the first embodiment.

In this way, when a prescribed frequency microwave signal is detected before the suspension of the first mixing and no prescribed microwave signals are detected after suspension of the first mixing, the prescribed frequency microwave signal detected before suspension of the first mixing can be judged to be an actual microwave signal.

In this connection, it should be noted that one aspect of the invention is directed to the processes carried out in Steps 3–5 of the flow chart shown in FIG. 2, and another aspect is directed to the processes carried out in the entire flow chart shown in FIG. 2. Namely, the function of the control means corresponds to Steps 1 and 3, the function of the judgement means can correspond to Steps 4 or 5 (which depend on Step 3 being carried out), and the function of the judgement means can correspond to Steps 2, 4 and 5.

Further, the invention can be constructed so that one of the first and second local oscillators oscillates at a fixed frequency while the other carries out a sweep oscillation, the information outputted from the reception means is in the form of detected wave outputs and signal strengths, and in the case where microwave signals having a prescribed frequency are detected both before and after suspension of the first mixing, the judgement means judges an actual microwave signal to have been received in the case where the signal strength of the prescribed frequency microwave signals detected after suspension of the first mixing is smaller than the signal strength of the prescribed frequency microwave signals detected before suspension of the first mixing. This invention relates to the second embodiment.

For example, in the case where an actual microwave signal and microwave interference are received simultaneously by the reception means, the reception means will continue to output a detected wave output even after the first mixing is suspended, and this can lead to the false judgement that the detected wave output before suspension of the first mixing was due to microwave interference (i.e., the false judgement that no actual microwave signals were received). However, because the signal strength due to an actual microwave signal is different from the signal strength due to microwave interference, even when a detected wave output is outputted both before and after suspension of the first mixing, it is possible to judge whether or not an actual microwave signal is mixed in with the microwave interference by judging whether or not there is a difference in signal strengths before and after suspension of the first mixing.

Further, the invention can be constructed so that one of the first and second local oscillators oscillates at a fixed frequency while the other carries out a sweep oscillation, the information outputted from the reception means is in the form of detected wave outputs, and in the case where microwave signals having a prescribed frequency are detected both before and after suspension of the first mixing, the judgement means judges an actual microwave signal to have been received in the case where the number of prescribed frequency microwave signals detected after suspension of the first mixing is smaller than the number prescribed frequency microwave signals detected before suspension of the first mixing. This invention relates to the third embodiment.

Namely, in the case where an actual microwave signal and microwave interference are received simultaneously by the reception means, a detected wave output is outputted both before and after suspension of the first mixing, but because the detected wave output after the first mixing is suspended is due only to microwave interference, in the case where an microwave signal is mixed with microwave interference, there will be fewer detected wave signals after suspension of the first mixing. Accordingly, the invention makes it possible to accurately judge whether or not an actual microwave signal has been received by judging whether or not the number of detected wave signals in the detected wave output after suspension of the first mixing is less than the number of detected wave signals in the detected wave output before suspension of the first mixing.

Further, the invention can be constructed so that one of the first and second local oscillators oscillates at a fixed frequency while the other carries out a sweep oscillation, and the suspension of the first mixing is carried out during the next cycle after a prescribed frequency microwave signal has been detected. Namely, in the present invention, one of the first and second local oscillators oscillates at a fixed frequency while the other carries out a sweep oscillation. Thus, even if the frequency of local oscillator performing the sweep oscillation becomes blurred, it is possible to carry out reliable detection, and this results in improved accuracy.

Also, in the case where one of the local oscillators carries out a sweep oscillation, comparisons may be carried out to match the sweep cycle. Namely, in the case where a prescribed frequency microwave signal is detected during a sweep operation, the suspension of the first mixing is not carried out immediately. Instead, the sweep operation is continued to the end of the cycle in which detection occurred, and then the first mixing is suspending at the next sweep cycle. In this way, by carrying out comparisons for each detection state sweep cycle, it becomes possible to carry out highly accurate comparisons. Further, in the case where both local oscillators oscillate at fixed frequencies, a prescribed search period may be established to enable simultaneous comparison.

Further, by arranging the first local oscillator to oscillate at a fixed frequency and the second local oscillator to carry out a sweep oscillation, and by providing a second control means for carrying out a repeat sweep in which the sweep of the second local oscillator is returned by a prescribed amount when a prescribed frequency microwave signal is detected, the invention can be constructed so that the suspension of the first mixing by the first control means is carried out immediately after a prescribed frequency microwave signal has been detected, and the judgement of whether or not the prescribed frequency microwave signal detected by the reception means is due to an actual microwave signal is carried out by the judgement means based on a detected wave output outputted from the reception means during suspension of the first mixing by the first control means.

Further, by arranging the first local oscillator to oscillate at a fixed frequency and the second local oscillator to carry out a sweep oscillation, and by providing a second control means for carrying out a repeat sweep in which the sweep of the second local oscillator is returned by a prescribed amount when a prescribed frequency microwave signal is detected, the invention can be constructed so that the suspension of the first mixing by the first control means is carried out immediately after a prescribed frequency microwave signal has been detected, and the judgement means judges an actual microwave signal to have been detected when no prescribed frequency microwave signals are detected within a prescribed sweep width after suspension of the first mixing (claim 8).

In this regard in the invention of the fourth embodiment. The suspension of the first mixing is carried out immediately after a prescribed frequency microwave signal has been detected. Next, a repeat sweep is carried out after the output of the second local oscillator has been returned by a prescribed amount. Then, in the case where no prescribed frequency microwave signals are detected during such repeat sweep, the previously detected prescribed frequency microwave signal is judged to be an actual microwave signal. On the other hand, in the case where a prescribed frequency microwave signal is detected during such repeat sweep, the previously detected prescribed frequency microwave signal is considered to be due to microwave interference. Thus, by arranging for the first mixing to be suspended immediately after a prescribed frequency microwave signal has been detected (i.e., by not waiting for the next sweep cycle), it becomes possible to carry out rapid judgements.

In this connection, the prescribed return amount established for the repeat sweep may be a fixed amount or an appropriate amount to enable a return to the initial starting point of the sweep.

Further, by providing resumption means for resuming the first mixing after the judgement means judges an actual microwave signal to have been detected, the invention can be constructed so that the judgement means carries out a confirmation judgement in which the detection of an actual microwave signal is confirmed when a prescribed frequency microwave signal is detected after the first mixing is resumed. This invention relates to the fifth embodiment. Now, when an arrangement like that is used, it becomes difficult for the judgement means to misjudge temporarily leaking microwave interference as an actual microwave signal.

Now, even though the suspension of the first mixing is described in the preferred embodiments as being carried out by turning OFF the first local oscillator, the present invention is not limited to this arrangement, and it is possible to employ any adequate structure or process for suspending the first mixing, such as the provision of a switch or the like between the first local oscillator and the first mixer to open or close the connection therebetween.

DETAILED DESCRIPTION OF THE PREFERRED EMBODIMENTS

Figure 1:
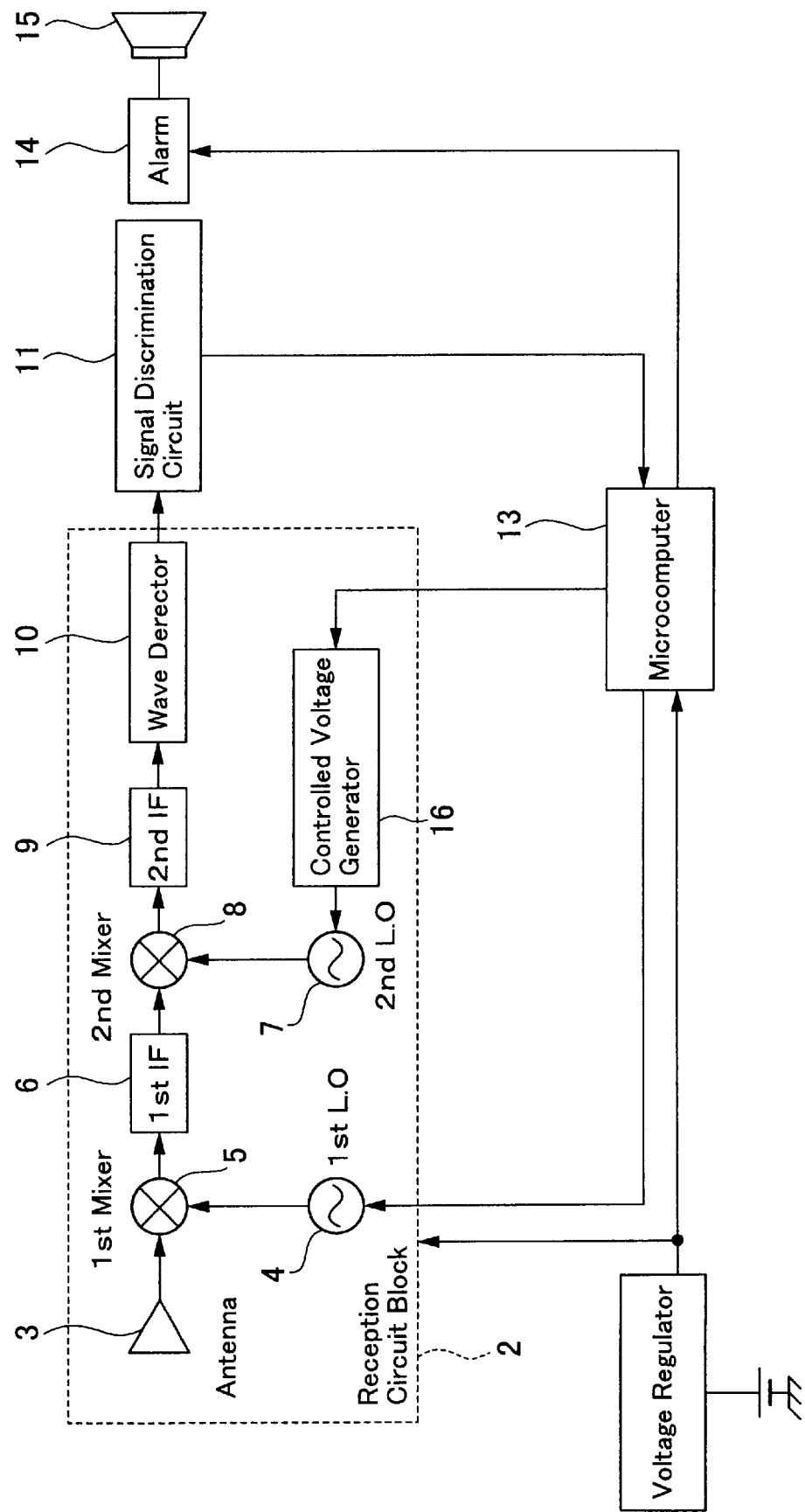
FIG. 1 is a block diagram showing the overall structure of a microwave detector according to a first embodiment of the present invention.

FIG. 1 shows the overall structure of a first embodiment of a microwave detector according to the present invention. The microwave detector shown in this drawing is provided with a well-known double superheterodyne type reception circuit block 2. Namely, microwaves from outside are picked up by a horn antenna 3 and mixed in a first mixer 5 with the output from a first local oscillator 4. The intermediate frequency signals obtained in this way are passed through a first intermediate frequency amplifier 6 and mixed in a second mixer 8 with the output from a second local oscillator 7, and then the resulting output is inputted into a wave detector 10 via a second intermediate frequency amplifier 9, whereby the wave detector 10 carries out a wave detection process. In this connection, the wave detection method used by the wave detector 10 may employ AM wave detection, FM wave detection or any other wave detection method.

In the present embodiment, the first local oscillator 4 uses an oscillator which oscillates at a fixed frequency, and the second local oscillator 7 uses a voltage controlled variable frequency oscillator (VCO) to generate a sweep. Further, the second local oscillator 7 carries out control by controlling the voltage of a sawtooth or triangular voltage waveform generated by a controlled voltage generator 16 so as to create an output signal for repeatedly sweeping a prescribed frequency band.

Next, based on the wave detection signal outputted from the wave detector 10, a judgement is carried out by a signal discrimination circuit 11 to determine whether or not there exists a microwave signal having the same frequency as the actual detection target microwave frequency, and in the case where there exists a microwave signal having such prescribed frequency, a reception signal is sent to a microcomputer 13. In this regard, the signal discrimination circuit 11 is constructed from a comparator, and when the wave detection signal is greater than a threshold value Th, the signal discrimination circuit 11 is designed to output a pulse (reception signal).

On the other hand, by providing the internal memory (not shown in the drawings) and processing portion (not shown in the drawings) with a built-in program, the microcomputer has two functions worthy of mentioning. One of these functions is a judgement function for judging whether or not the reception circuit block 2 has received an actual microwave signal based on the reception signal outputted from the signal discrimination circuit 11. Now, when an actual microwave signal is judged by this judgement function to have been received, a detection signal is sent to an alarm circuit 14, and upon receiving such detection signal, the alarm circuit 14 activates an alarm unit 15 equipped with a speaker and an alarm lamp such as an LED (not shown in the drawings), whereby an audio alarm and visual alarm are outputted. In this regard, for the embodiment shown in the drawings, the alarm circuit 14 and the alarm unit 15 form an alarm means.

Further, the other function of the microcomputer 13 is a control function for controlling the ON/OFF state of the first local oscillator 4. Namely, during a normal detection operation (in which the first local oscillator is ON), if a reception signal is received from the signal discrimination circuit 11, the control function will carry out controls to turn OFF the first local oscillator 4 and suspend the frequency mixing carried out by the first mixer 5.

Figure 2:
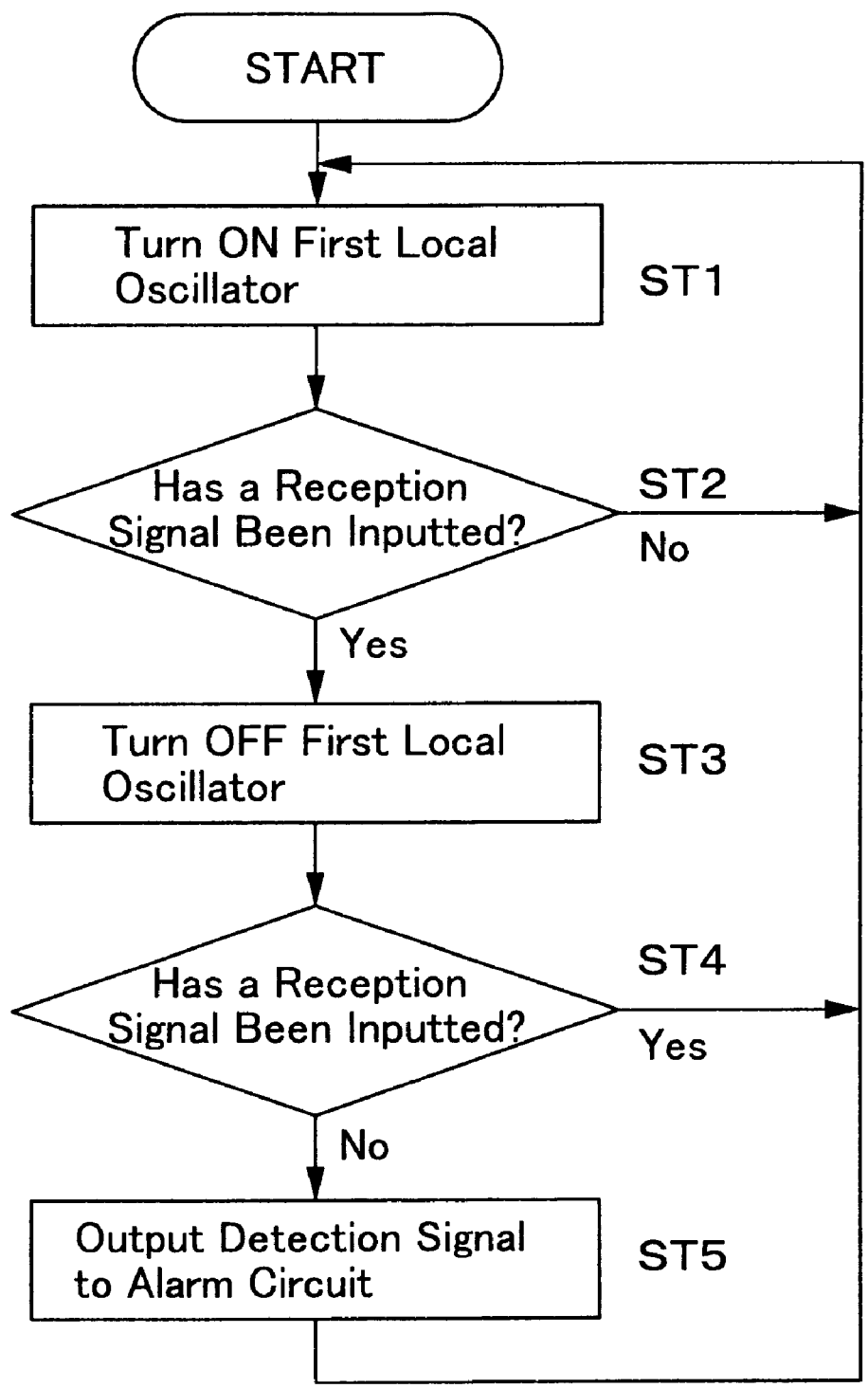
FIG. 2 is a flow chart showing the function of the microcomputer.

A detailed representation of such functions of the microcomputer 13 is illustrated by the flow chart shown in FIG. 2. These two functions (i.e., the judgement function and control function) of the microcomputer 13 make it possible to judge whether or not an actual microwave signal having a prescribed frequency has been received from the antenna 3.

As shown in FIG. 2, the microcomputer 13 turns ON the first local oscillator 4. In this way, a normal detection process is carried out in the reception circuit block 2. Namely, with the first local oscillator 4 oscillating at a fixed frequency and the second local oscillator 7 performing a repeated sweep within a prescribed frequency band, a double superheterodyne type reception is carried out. Accordingly, in the case where an actual microwave signal is received while microwave interference leaks into the first intermediate frequency amplifier 6, a reception signal will be outputted from the signal discrimination circuit 11.

In this state, a judgement is carried out to determine whether or not a reception signal (i.e., a pulse output from the signal discrimination circuit 11) has been received (ST2). Then, if a reception signal has been received, the control function is activated to turn OFF the first local oscillator 4 (ST3).

Next, a judgement is carried out to determine whether or not a reception signal continues to be inputted even after the first local oscillator 4 has been turned OFF (ST4). In the case where the judgment at Step 4 indicates that no reception signal is being inputted, an actual microwave signal is judged to have been received, at which point a detection signal is outputted to the alarm circuit 14 (ST5). On the other hand, in the case where the judgment at Step 4 indicates that a reception signal is being inputted, the reception signal is judged to be the result of microwave interference, and then without emitting an alarm, the process returns to Step 1 to return to a normal detection operation.

Namely, in the case of an actual microwave signal, the output signal of the first local oscillator 4 undergoes frequency mixing in the first mixer 5 to be converted into signals (frequencies) in the intermediate frequency band, while in the case of microwave interference, such microwaves have frequencies that originate in the intermediate frequency band. Accordingly, when the first local oscillator 4 is turned OFF, even if an actual microwave signal passes through the first mixer 5, such signal will not have a frequency in the intermediate frequency band, and therefore no reception signal will be generated. On the other hand, in the case of microwave interference, because the frequency of such microwaves is originally in the intermediate frequency band, a reception signal will be generated regardless of the ON/OFF state of the first local oscillator 4. In accordance with this principle of operation, the judgement carried out at Step 4 makes it possible to generate an alarm only when an actual microwave signal is received, whereby it becomes possible to prevent as much as possible the generation of false alarms.

Namely, in the case described above where no reception signal is received while the first local oscillator 4 is in an OFF state, the judgement function of the microcomputer 13 in the present embodiment judges an actual microwave signal to have been received (and in the case where a reception signal is received while the first local oscillator 4 is in an OFF state, such reception signal is judged to be due to microwave interference).

Figure 3:
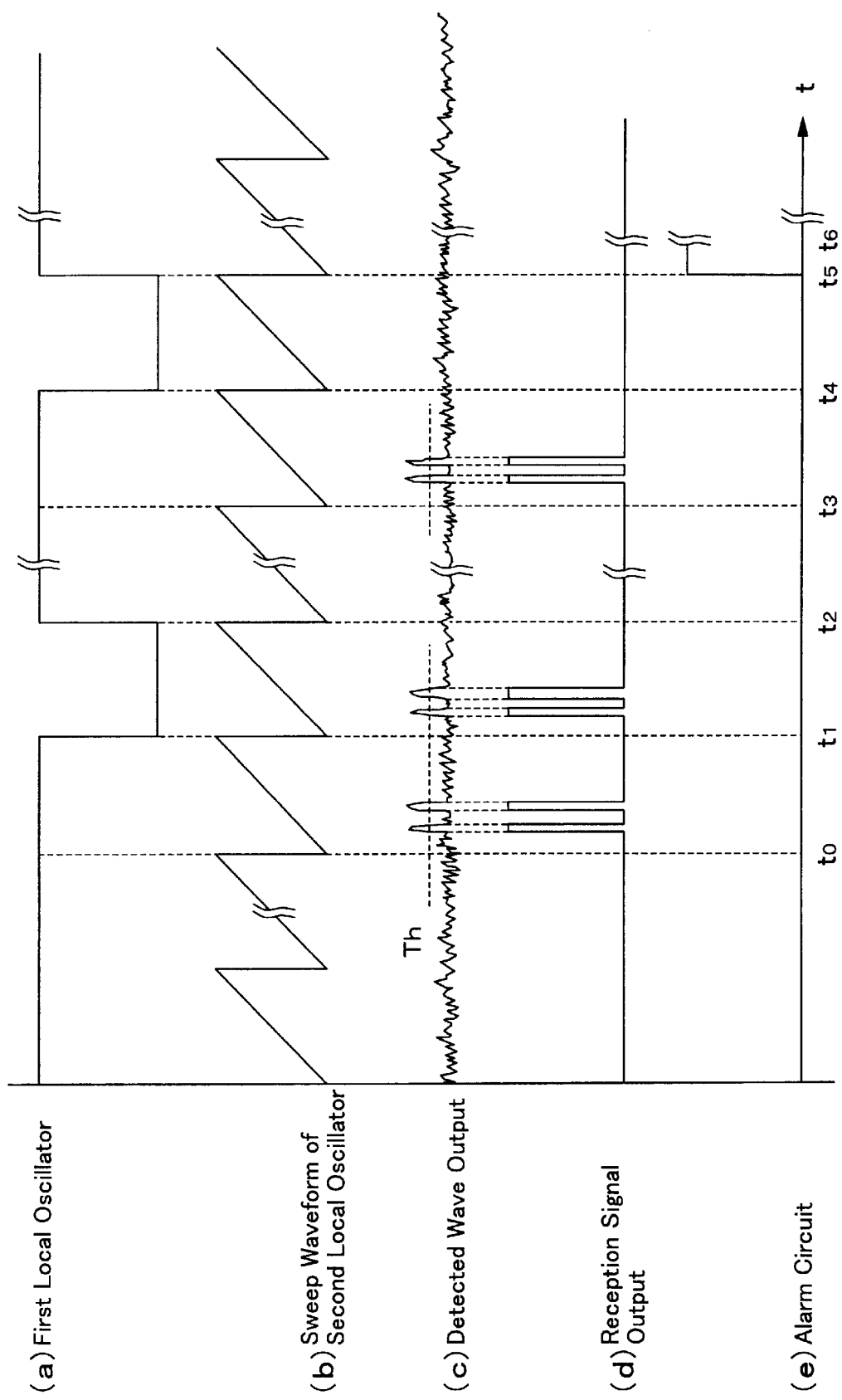
FIG. 3 is a timing diagram showing the operations of the microwave detector according to the first embodiment of the present invention.

In this connection, FIG. 3 shows example waveform diagrams of the wave detector 10, signal discrimination circuit 11 and alarm circuit 14 used in describing the operations of the present embodiment. As shown in FIG. 3, both local oscillators 4 and 7 are activated in their respective ON states up to a time t1 (see FIGS. 3(a) and 3(b)) in order to carry out a normal detection process. Then, if a microwave signal having a prescribed frequency is received during the time interval t0~t1 as shown in FIG. 3(c), two detected wave signals (peaks) will be generated in the detected wave output.

Thus, if the signal discrimination circuit 11 uses a comparator, for example, to establish a threshold value Th as a reference voltage to enable the discrimination of white noise, reception signals (pulses) which correspond to the detected wave signals (peaks) will be outputted as shown in FIG. 3(d).

At this point, in the prior art the alarm circuit would have been activated immediately after such pulses were received, but in the present embodiment an alarm is not outputted. Then, during the next time interval t1~t2, the first local oscillator 4 is turned OFF (see FIG. 3(a)). In this example, because a reception signal is generated with the first local oscillator 4 in an OFF state, such detection signal is judged to be due to microwave interference, and no alarm is outputted.

On the other hand, if a generated reception signal is received and then disappears when the first local oscillator 4 is turned OFF, as shown in the time interval t3~t5, then the reception signal generated in the time interval t3~t4 is judged to be due to an actual microwave signal, and an alarm is outputted for the time interval starting from t6.

Figure 4:
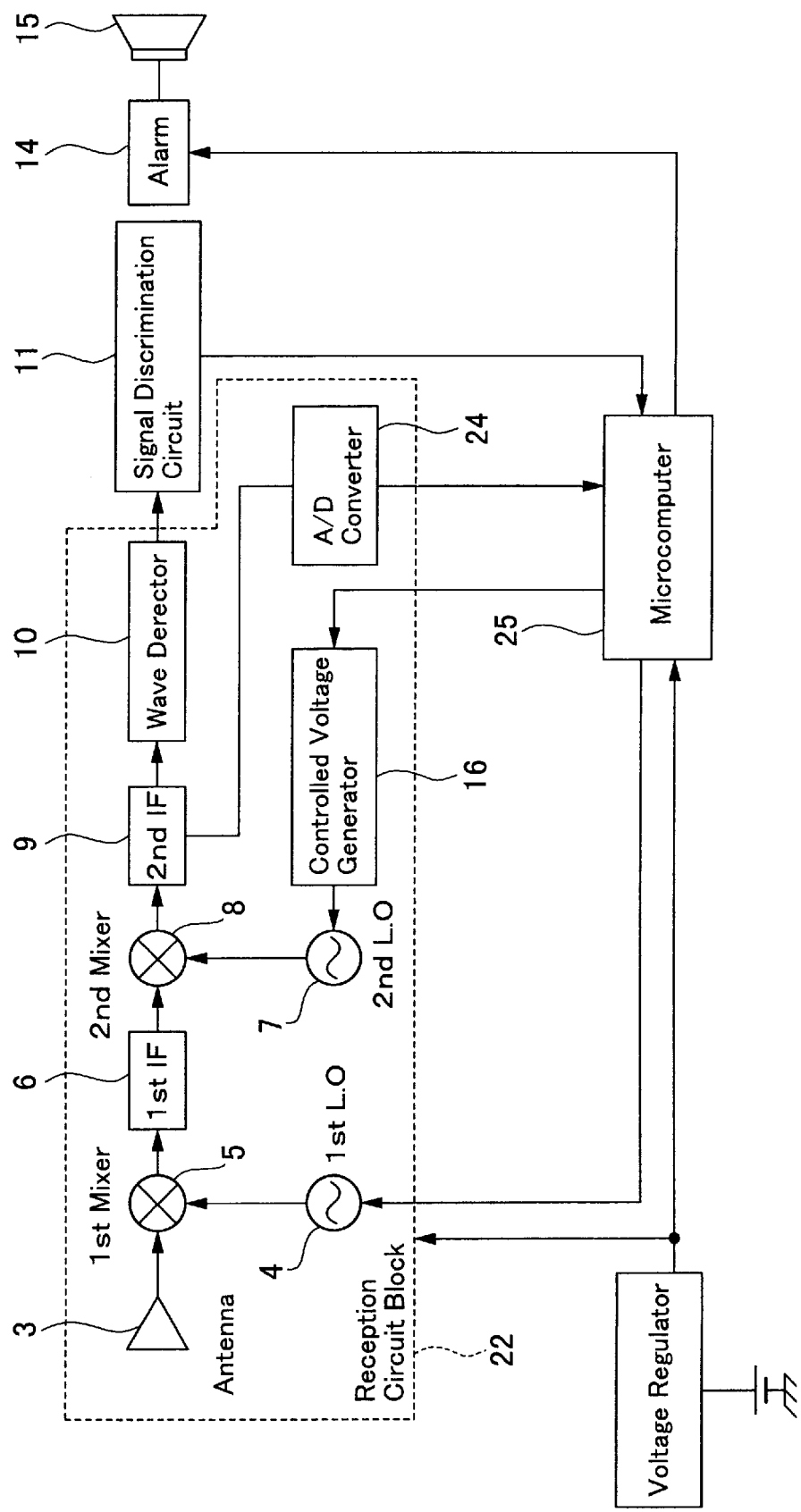
FIG. 4 is a block diagram showing the overall structure of a microwave detector according to a second embodiment of the present invention.

Next, FIG. 4 shows the overall structure of a second embodiment of a microwave detector according to the present invention. Basically, the microwave detector according to this second embodiment is a double superheterodyne type microwave detector that is very similar in structure and operation to the first embodiment. Thus, to understand the difference between the first and second embodiments, it should be noted that in the second embodiment the signal strength outputted from a second intermediate amplifier 9 inside a reception circuit block 22 is sent to a microcomputer 25 via an A/D converter 24.

Further, in this second embodiment, the signal strength is also taken into account in the judgement function performed by the microcomputer 25. However, the control function performed in the second embodiment is the same as that performed in the first embodiment, in which the first local oscillator 4 is turned OFF after a reception signal is received while the first local oscillator was in an ON state.

Figure 5:
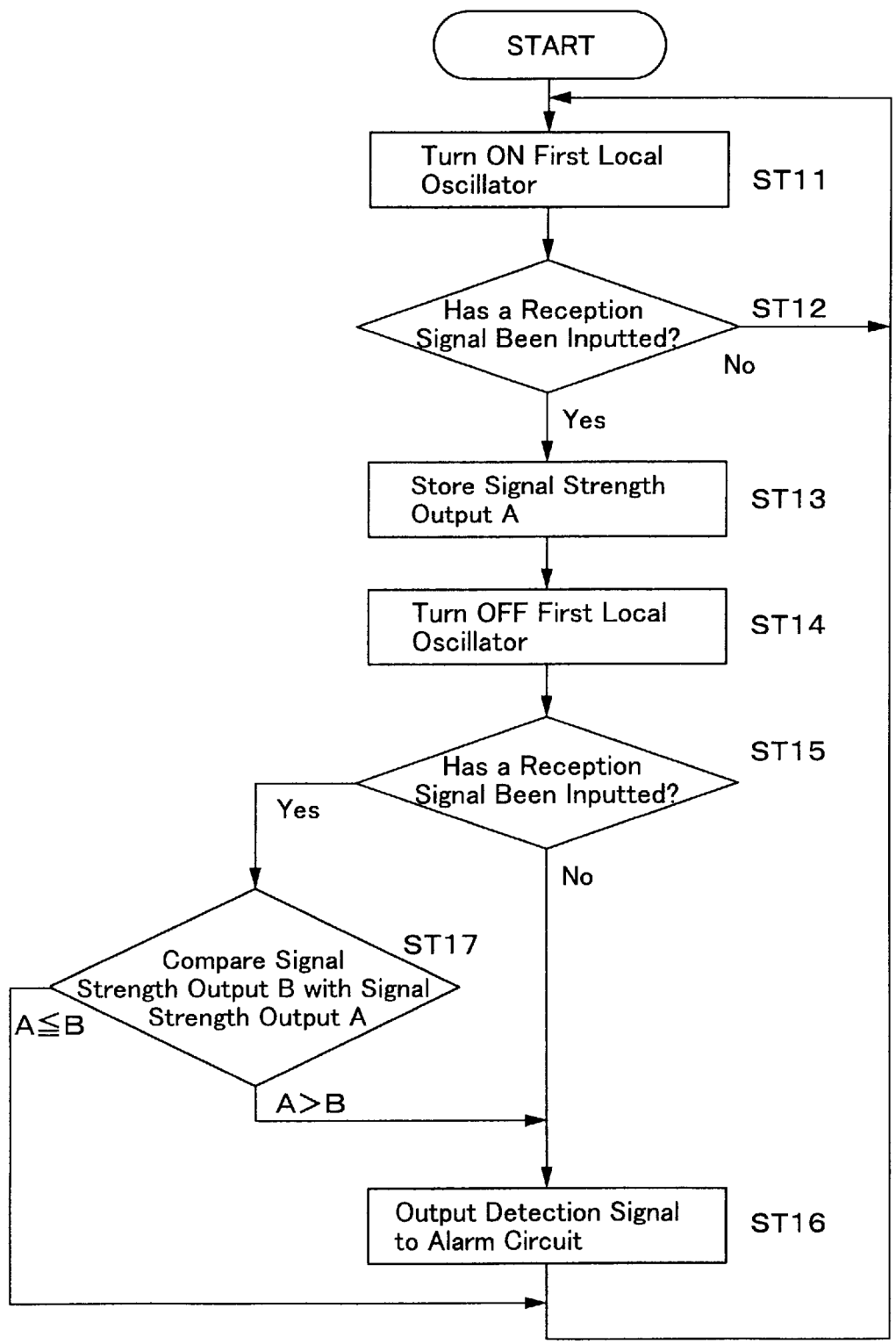
FIG. 5 is a flow chart showing the function of the microcomputer.

In this connection, FIG. 5 shows a flow chart of the specific functions of the microcomputer 25. Namely, with the first local oscillator 4 in an ON state, the microcomputer 25 waits for a reception signal to be inputted (ST11, ST12). Then, when a reception signal is received, the signal strength A of such reception signal is acquired and stored in memory (ST13).

Next, the first local oscillator 4 is turned OFF (ST14), and a judgement is carried out to determine whether or not a reception signal is inputted (ST15). Then, in the case where no reception signal is received, an actual microwave signal is judged to have been received based on the same reasoning described above in the first embodiment, and a detection signal is outputted to the alarm circuit 14 (ST16). Upon receiving the detection signal, the alarm circuit 14 outputs an alarm.

Now, in the case where a reception signal is inputted at Step 15 in the present embodiment, the current signal strength B at this time is compared with the previous signal strength A stored in memory (ST17), and if the previous signal strength A is larger than the current signal strength B, the previous reception signal is judged to be due to an actual microwave signal, and the process program skips to Step 16 to output a detection signal to the alarm circuit 14. On the other hand, if the current signal strength B and the previous signal strength A are the same, or if the current signal strength B is larger than the previous signal strength A, the previous reception signal is judged to be due to microwave interference, and no detection signal is outputted.

Namely, there are occasions when a detected wave output due to an actual microwave signal and a detected wave output due to microwave interference are simultaneously received during the first sweep operation. In such case, the signals due to microwave interference are usually smaller. Accordingly, in the case where a detected wave output due to an actual microwave signal and a detected wave output due to microwave interference are mixed together, the signal strength of the signal due to an actual microwave signal is larger than the signal strength of the signal due to microwave interference. Consequently, when the first local oscillator 4 is turned OFF, the detected wave output will be based only on the microwave interference, and this results in a lowering of the signal strength of the reception signal.

Thus, in the case where the signal strength detected while the first local oscillator 4 is in an ON state is larger than the signal strength detected after the first local oscillator 4 is turned OFF, an actual microwave signal is judged to be present at Step 17, and an alarm is generated. On the other hand, in the case where only microwave interference is present, because there will be very little change in the signal strength after the first local oscillator 4 is turned OFF, the judgement $A \leq B$ is made at Step 17, and no alarm is generated.

In this connection, a prescribed dispersion may be taken into account for the signal strength. Accordingly, a prescribed margin $\alpha$ may be established for the judgement carried out at Step 17. Namely, by using $A > B + \alpha (A \leq B - \alpha)$ as the basis for whether or not a detection signal will outputted, it is possible to establish a prescribed microwave interference dispersion. However, if the value of $\alpha$ is made too large, the reception of an actual microwave signal will be misjudged as microwave interference, and for this reason it is necessary to establish a proper value.

Figure 6:
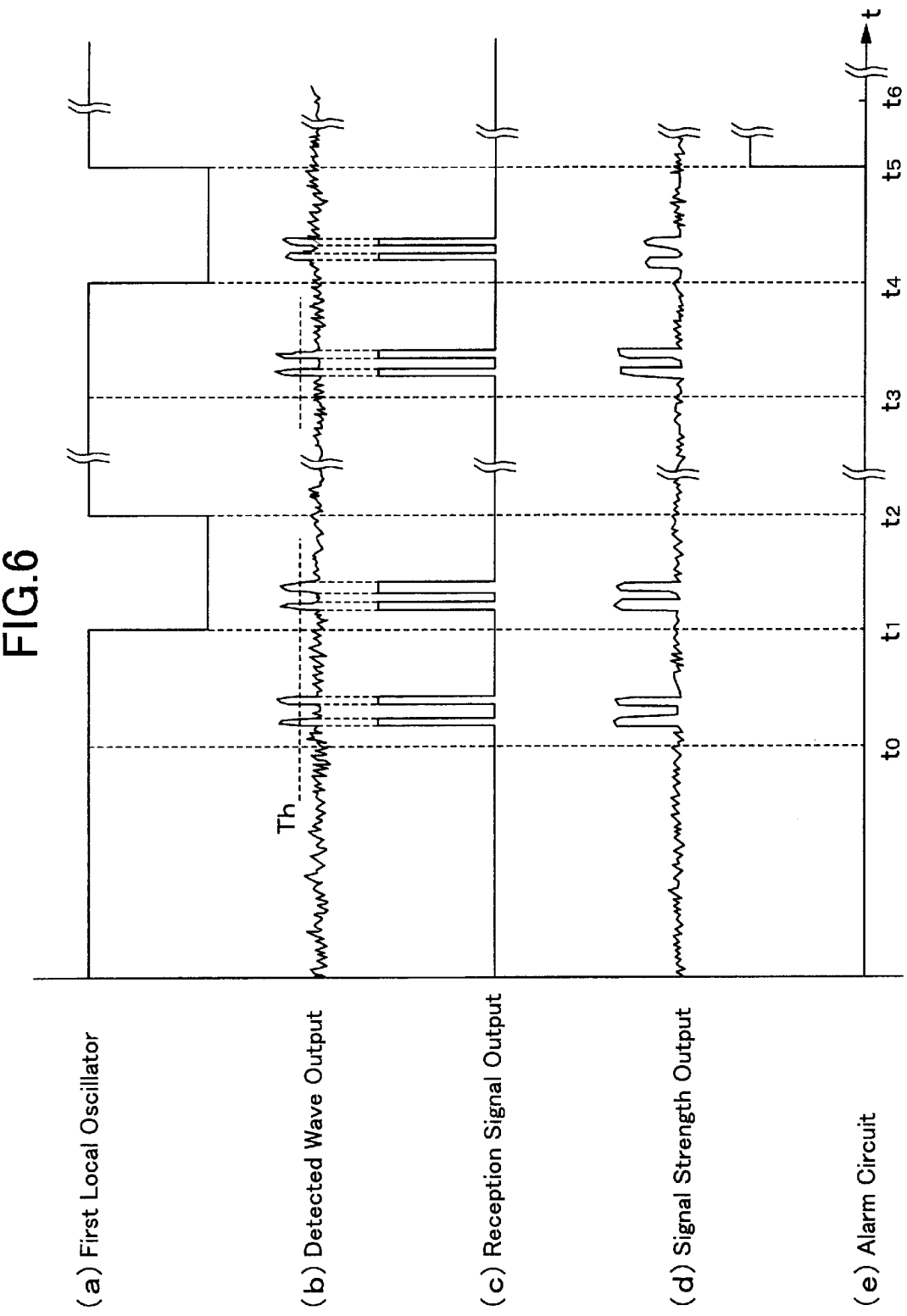
FIG. 6 is a timing diagram showing the operations of the microwave detector according to the second embodiment of the present invention.

In this connection, FIG. 6 shows example waveform diagrams of the wave detector 10, signal discrimination circuit 11 and alarm circuit 14 used in describing the operations of the present embodiment. As shown in FIG. 6, both local oscillators 4 and 7 are activated in their respective ON states up to a time t1 (see FIGS. 6(a) and 6(b)) in order to carry out a normal detection process. Then, if a microwave signal having a prescribed frequency is received during the time interval t0~t1 as shown in FIG. 6(c), two detected wave signals (peaks) will be generated in the detected wave output, and upon receiving such signals, the first local oscillator 4 is turned OFF. Now, if a detected wave signal is also present during the OFF state time interval (t1~t2), a reception signal will be outputted, and this results in the jugdement at Step 17 being carried out. In such case, because the signal strength for the time interval (t0~t1) is the same as the signal strength for the following time interval (t1~t2), the reception signal received during the time interval (t0~t1) is judged to be due to microwave interference, and no alarm is generated.

On the other hand, for the time intervals (t3~t4) and t4~t5) which both receive a reception signal, because the signal strength for the time interval (t3~t4) is larger than the signal strength for the time interval t4~t5), the reception signal received during the time interval (t3~t4) is judged to be due to an actual microwave signal, and an alarm is outputted during the next time interval (i.e., starting from time t6).

Further, although not specifically shown in the drawings, in the case where the detected wave output disappears when the first local oscillator 4 is turned OFF, an alarm is generated in the same manner as that described above for the first embodiment. Moreover, because the other elements and operational results of the second embodiment are the same as those of the first embodiment, the same reference characters are used without further description.

Figure 7:
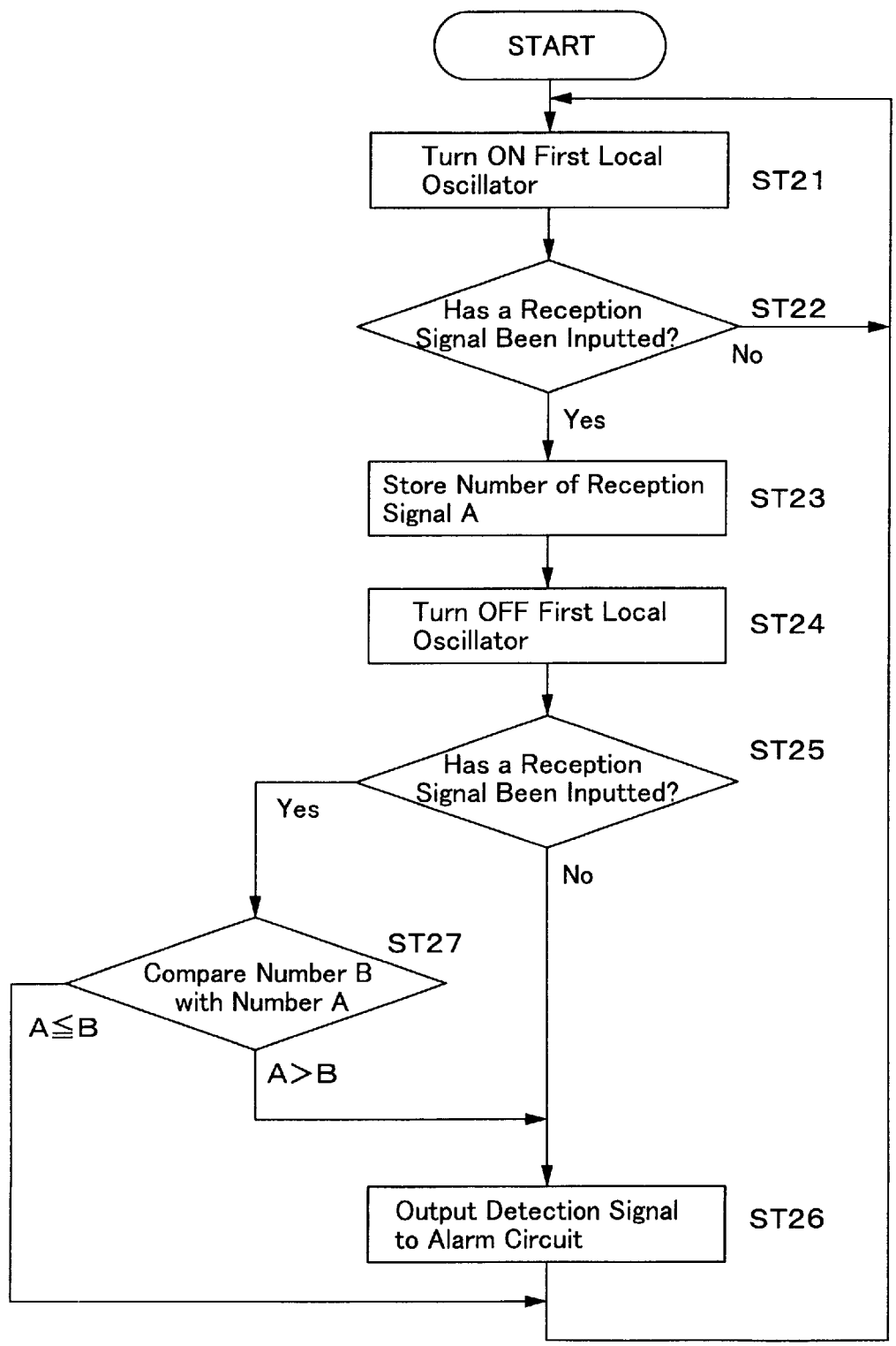
FIG. 7 is a flow chart showing the function of the microcomputer.

Next, FIG. 7 shows a flow chart for the essential portion of a microwave detector according to a third embodiment of the present invention. Now, because the hardware elements of the third embodiment are the same as those of the first embodiment, no description and drawings for such structure will be presented, and in the description given below, the same element names and reference characters used in the first embodiment will be used in third embodiment. Furthermore, except for the processing method of the microcomputer 13, all other operations of the microwave detector according to the third embodiment are the same as those of the first embodiment.

Namely, the difference between the third embodiment and the first embodiment lies in the provision of a different function for the microcomputer 13. Further, as was the case for the second embodiment, the third embodiment is provided to deal with the case in which detected wave outputs due to both an actual microwave signal and microwave interference are received simultaneously. In this regard, while the second embodiment used signal strengths, in this third embodiment judgements are carried out based on the number of generated reception signals (pulses).

Namely, as shown in FIG. 7, with the first local oscillator 4 in an ON state, the microcomputer 13 waits for a reception signal to be inputted (ST2 1, ST22). Then, when reception signals are received, the number of such reception signals A is acquired and stored in memory (ST23).

Next, the first local oscillator 4 is turned OFF (ST24), and a judgement is carried out to determine whether or not reception signals are inputted (ST25). Then, in the case where no reception signals are received, an actual microwave signal is judged to have been received based on the same reasoning described above in the first and second embodiments, and a detection signal is outputted to the alarm circuit 14 (ST26). Upon receiving the detection signal, the alarm circuit 14 outputs an alarm.

Now, in the case where reception signals are inputted at Step 25 in the present embodiment, the number of reception signals B at this time is compared with the previous number of reception signals A stored in memory (ST27), and if the previous number A is larger than the current number B, the previous reception signals are judged to be due to an actual microwave signal, and the process program skips to Step 26 to output a detection signal to the alarm circuit 14. On the other hand, if the current number of reception signals B is the same as the previous number of reception signals A (i.e., A=B), or if the current number of reception signals B is larger than the previous number of reception signals A, the previous reception signals are judged to be due to microwave interference, and no detection signal is outputted.

Namely, in the case where the first local oscillator 4 is turned OFF after an actual microwave signal is detected during normal operations, because the reception signals due to the actual microwave signal will be absent during the time the first local oscillator 4 is in the OFF state, the number of reception signals at such time will be reduced by exactly the number of reception signals due to the actual microwave signal. Thus, in accordance with this principle, in the case where the judgement at Step 27 reveals that the number of reception signals detected during the ON state of the first local oscillator 4 was larger than the number of reception signals detected during the OFF state thereof, an actual microwave signal is judged to be present, and an alarm is generated. On the other hand, in the case where only microwave interference is present, because the number of reception signals basically will not change, the judgement A≦B is made at Step 27, and no alarm is generated.

Figure 8:
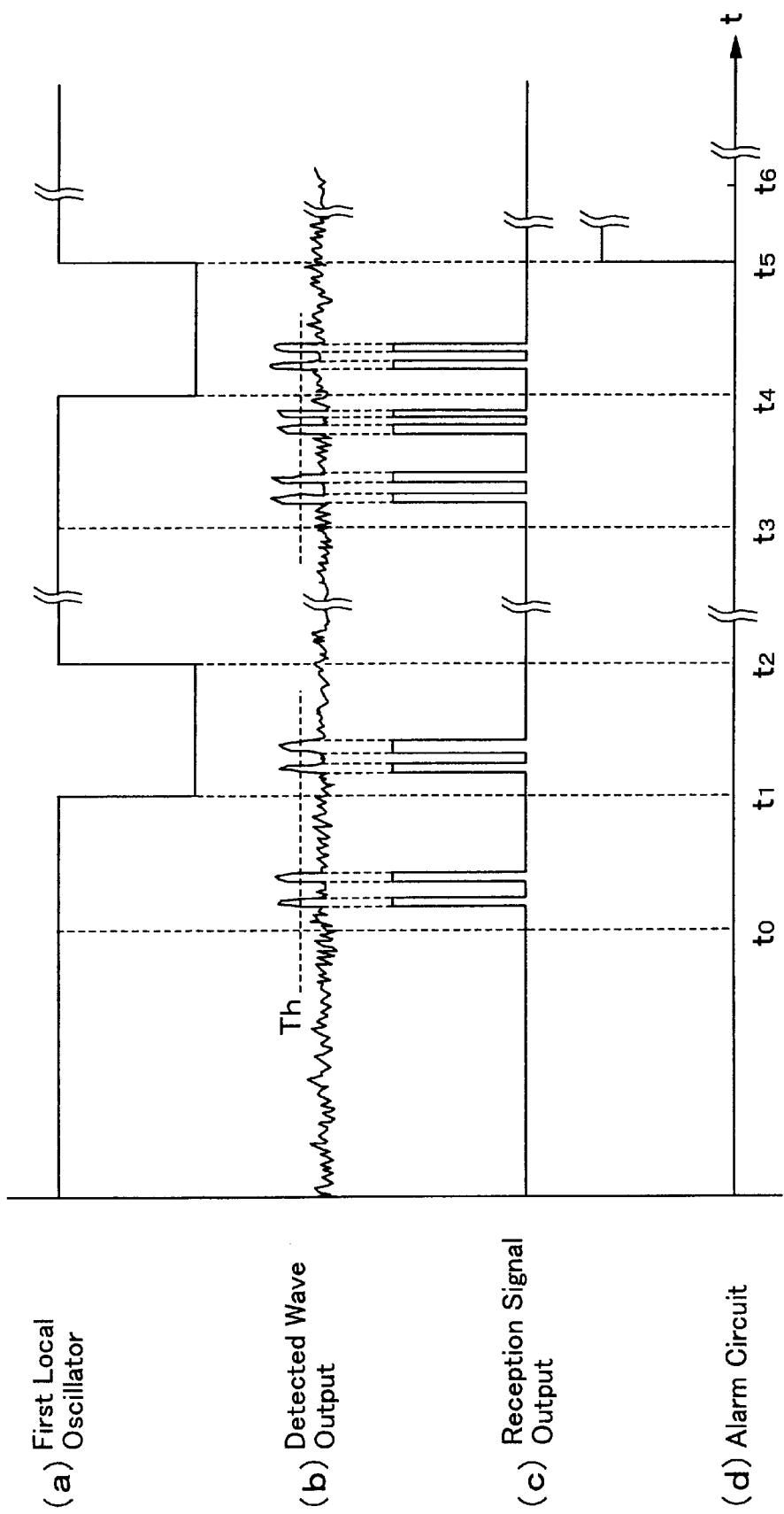
FIG. 8 is a timing diagram showing the operations of the microwave detector according to the third embodiment of the present invention.

In this connection, in the example shown in FIG. 8, the same number of reception signals are shown to be generated in the time intervals (t0~t1) and (t1~t2). Accordingly, these reception signals are judged interference, and no alarm is generated. On the other hand, because the number of reception signals for the ON state time interval (t3~t4) is greater than the number of reception signals for the OFF state time interval t4~t5), the judgement A>B is made at Step 27, and an alarm is outputted during the next time interval (i.e., starting from time t6).

Figure 9:
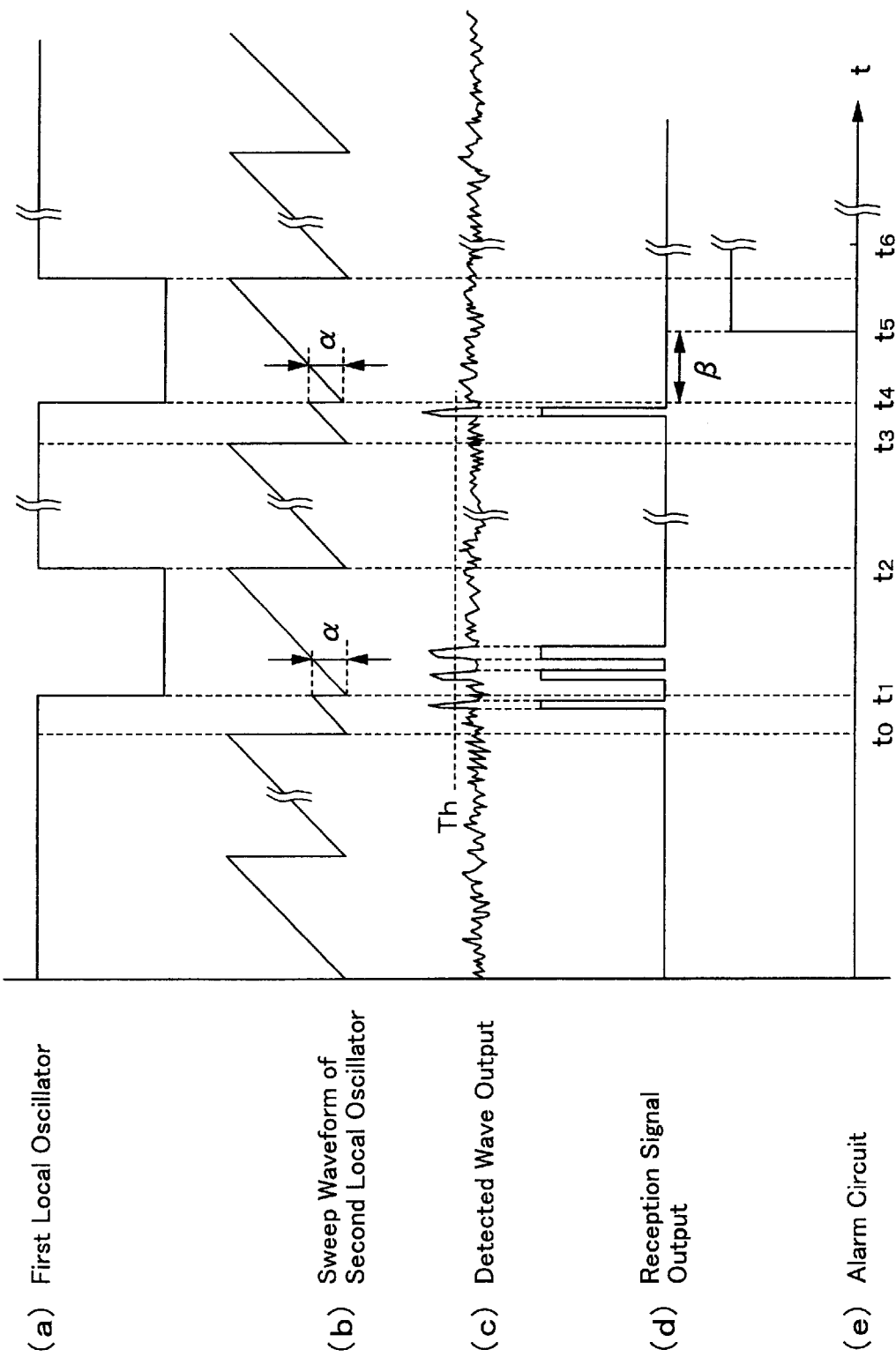
FIG. 9 is a timing diagram showing the operations of the microwave detector according to the fourth embodiment of the present invention.

Next, FIG. 9 shows waveform diagrams used in describing the essential portion of a microwave detector according to a fourth embodiment of the present invention. In this regard, the hardware elements of the fourth embodiment are the same as any of the embodiments described, but the functions of the microcomputer are different. Namely, as shown by FIGS. 9(d) and 9(e), the microcomputer which receives reception signals from the signal discrimination circuit 11 includes a first control function for directly turning OFF the first local oscillator 4, and a second function for sending repeat sweep commands to the controlled voltage generator 16. Further, as shown by FIG. 9(b), the controlled voltage generator 16 includes a function for carrying out a repeat sweep after returning by only a prescribed amount α. In this regard, the prescribed amount cc may be a fixed amount determined in advance to serve as an absolute amount as shown in the drawing, or an appropriate amount to enable a return to the initial value of the sweep. Preferably, an absolute amount is used to make it possible to carry out detection within a short time period. On the other hand, if a return to the initial value is used, it becomes easy to carry out control.

Further, the judgement function of the microcomputer judges whether or not an actual microwave signal has been received based on the reception signal outputted after mixing is suspended (i.e., after the first local oscillator 4 is turned OFF). Namely, in the case where no reception signal is detected within a prescribed sweep width β after the first local oscillator 4 has been turned OFF, an actual microwave signal is judged to be received and a detection signal is outputted. On the other hand, in the case where a reception signal is detected in such prescribed sweep width β, microwave interference is judged to be received and no detection signal is outputted. Further, the prescribed sweep width β may be a fixed amount of time determined in advance to serve as an absolute amount as shown in the drawing, or the remaining amount of time of the sweep. In this regard, the use of an absolute amount makes it possible to improve the detection accuracy, while the use of the remaining amount of time makes easy to carry out control.

Next, with reference to FIG. 9, the operation and functions of the present embodiment will be described. As shown in FIG. 9, both local oscillators 4 and 7 are activated in their respective ON states up to a time t1 (see FIGS. 9(a) and 9(b)) in order to carry out a normal detection process. Then, if a microwave signal having a prescribed frequency is received during the time interval t0~t1 as shown in FIG. 9(c), a detected wave signal (peak) will be generated in the detected wave output, and as shown in FIG. 9(d), the signal discrimination circuit 11 outputs a reception signal (pulse) which corresponds to such detected wave signal (peak).

Upon receiving this reception signal, the first local oscillator 4 is immediately turned OFF for the time interval (t1~t2) (see FIG. 9(a)), and a repeat sweep is carried out after the transmission signal has been returned a prescribed amount α. In this example, because a reception signal is generated during such repeat sweep while the first local oscillator 4 is in an OFF state, the reception signal generated in the time interval (t0~t1) is judged to be due to microwave interference, and no alarm is outputted.

On the other hand, for the time interval t3~t5), immediately after a reception signal is generated in the time interval (t3~t4), the first local oscillator 4 is turned OFF, and because no reception signal is generated during the repeat sweep in the time interval t4~t5), the reception signal generated in the time interval (t3~t4) is judged to be due to an actual microwave signal, and an alarm is immediately outputted.

Figure 10:
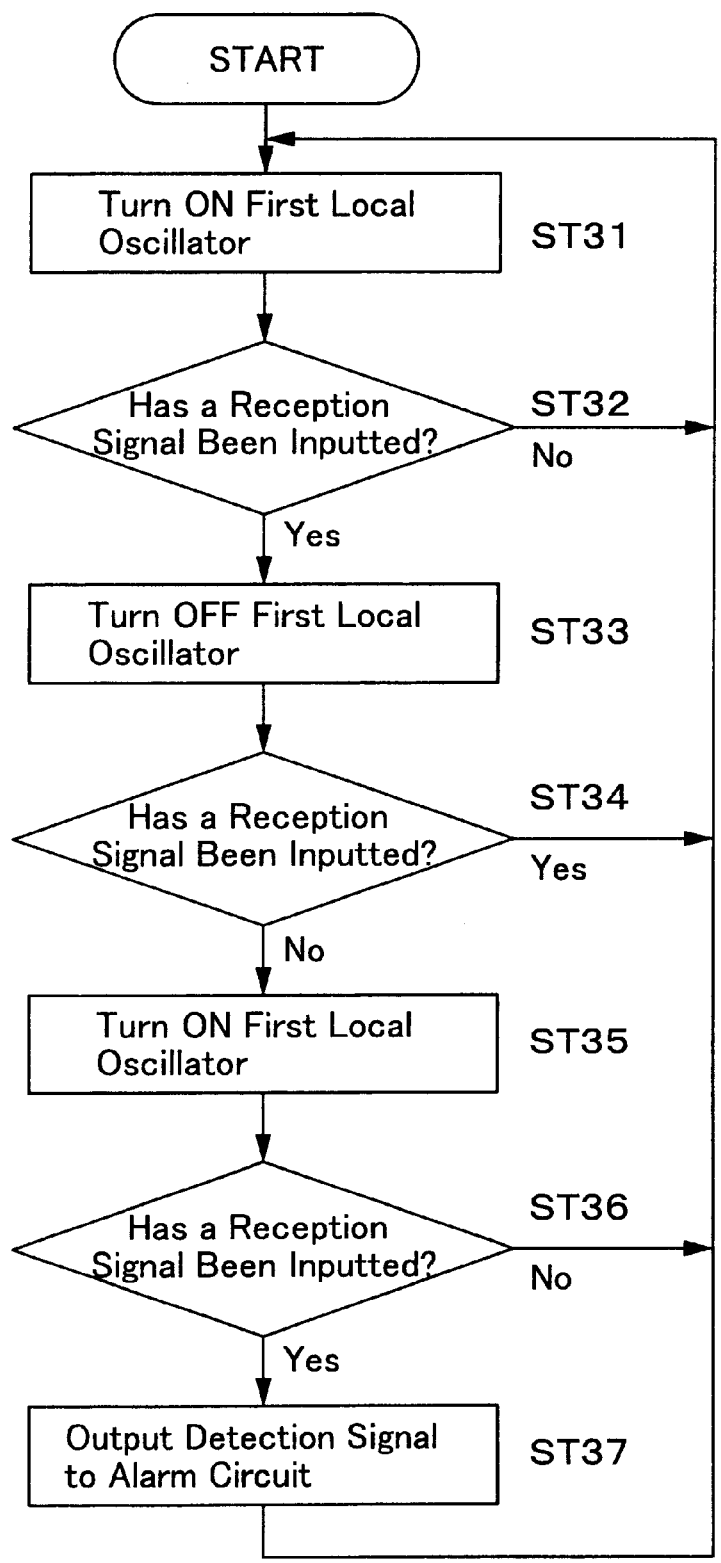
FIG. 10 is a flow chart showing the function of the microcomputer in the microwave detector according to the fifth embodiment of the present invention.

Next, FIG. 10 shows a flow chart for the essential portion of a microwave detector according to a fifth embodiment of the present invention. In this fifth embodiment, the hardware elements of the microwave detector are the same as those of first embodiment, but the microcomputer 13 performs a different function as shown in FIG. 10. Thus, a description of this different function will be given below.

In each of the embodiments described above, if a reception signal is detected during normal operations (ST31, ST32), the first local oscillator 4 is turned OFF (ST33), and then a judgement of whether or not an actual microwave signal was received is carried out by determining whether or not a reception signal is received during such OFF state (ST34).

However, in the present embodiment, even in the case where no reception signal is received when the first local oscillator 4 is in an OFF state, namely, even in the case where the first embodiment would judge an actual microwave signal to be present, an alarm is not immediately generated. Instead, the first local oscillator is turned ON to carry out normal reception operations (ST35), and in this state a judgement is carried out again to determine whether or not a reception signal is received (ST36). Then, in the case where a reception signal is generated during such ON state, a detection signal is outputted to the alarm circuit 14 to begin generating an alarm. Thus, by arranging for the microwave detector to generate an alarm only after a three-step condition has been satisfied, it becomes possible to further reduce the occurrence of false alarms.

Figure 11:
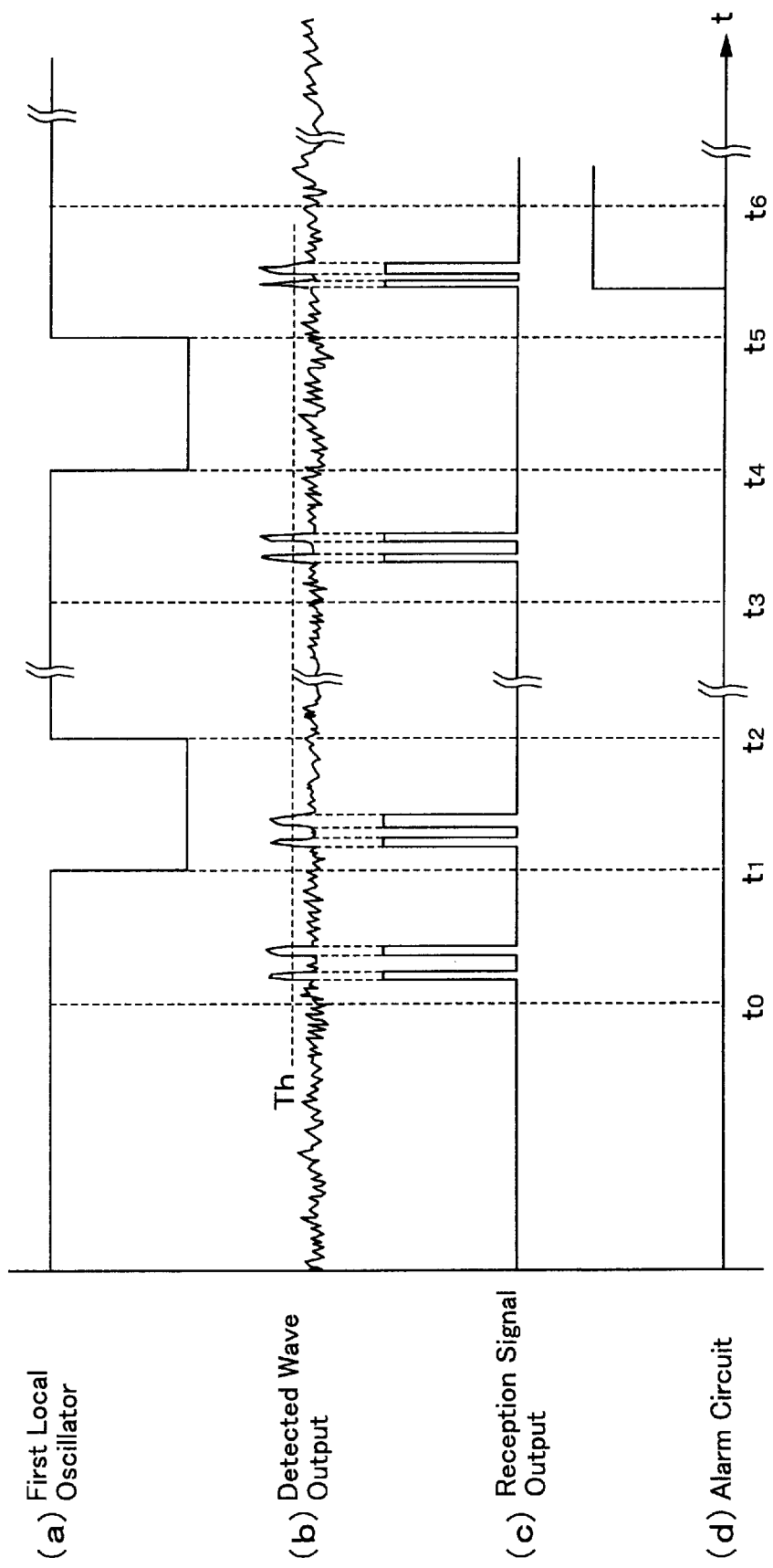
FIG. 11 is a timing diagram showing the operations of the microwave detector according to the fifth embodiment of the present invention.

Accordingly, for the specific example shown in FIG. 11, even in the case where there is a reception signal for the ON state time interval (t0~t1) and no reception signal for the OFF state time interval (t1~t2), because there is no reception signal for the ON state time interval (t2~t3), no alarm will be generated. However, for the time interval (t3~t6), in which there is a reception signal for the ON state time interval (t3~t4) and no reception signal for the OFF state time interval t4~t5), because there is a reception signal for the ON state time interval (t5~t6), an alarm will be generated.

Further, although no specific example is shown in the drawings, in the case where a reception signal is received while the first local oscillator 4 is in an OFF state, the present embodiment will judge such reception signal to be due to microwave interference in the same manner as was described above for the first embodiment, and no alarm will be generated.

At this point, it should be noted that this three-step function of the microcomputer (i.e., the function in which an alarm is generated only after a reception signal is detected once more when the first local oscillator 4 is turned ON again to return to normal reception operations) is not limited to use with the first embodiment, and it is of course possible to use such function with the second and third embodiments.

OTHER MODIFICATIONS

In the embodiments described above, a threshold value process is carried out by the signal discrimination circuit 11, whereby converted pulse signals are sent to the microcomputer. However, it is possible to eliminate the signal discrimination circuit by providing an A/D converter to supply the digital value of the detected wave output directly to a computer arranged to carry out a judgement process which includes a threshold value process.

Furthermore, the judgement of the presence or absence of a reception signal is not limited to the threshold process described above (i.e., the method of regarding all signals below a prescribed voltage as noise), and it is possible to use any appropriate method to discriminate signals from noise. For example, it is possible to use a method in which the sweeping operation of the second local oscillator is turned OFF when a signal appears in the detected wave output, and if reception continues for more than a prescribed time (while the sweeping operation is suspended), a reception signal is judged to be present.

Further, in order to conserve power, after each single sweep carried out by the second local oscillator, the reception circuit may be interrupted (i.e., the power supplied from the voltage regulator may be cut off) for a prescribed period of time to make it possible to adapt the present invention to an intermittent operation type microwave detector. Namely, such a microwave detector would normally operate in an intermittent state, but when a reception signal is present, the intermittent operations would be suspended to enable a process according to any of the flow charts described above to be carried out in order to judge whether or not an actual microwave signal has been received. Then, after such process has been completed, the microwave detector would return to intermittent state operations.

As described above, in the microwave detector according to the present invention, in the case where an actual microwave signal is received, there will be no detected wave output after the first local oscillator is turned OFF (i.e., after the mixing of the output of the first local oscillator with the microwaves received by the antenna is suspended). Accordingly, if a detected wave output is present during the OFF state of the first local oscillator, the reception signal received during the ON state is judged to be due to microwave interference (i.e., not an actual microwave signal). On the other hand, if there is no detected wave output during the OFF state of the first local oscillator, the reception signal received during the ON state is judged to be due to an actual microwave signal. Accordingly, it becomes possible to discriminate an actual microwave signal from microwave interference, and this in turn makes it possible to prevent the generation of false alarms.

What is claimed is:

1. A double superheterodyne type microwave detector, comprising:

a reception antenna;

a first local oscillator;

a second local oscillator;

reception means for detecting microwaves having prescribed frequencies based on signals obtained by carrying out a first mixing in which the output of the first local oscillator is mixed with the microwaves picked up by the antenna, and a second mixing in which the signals obtained from the first mixing are mixed with the output of the second local oscillator;

judgement means for judging whether or not an actual microwave signal which forms a detection target has been detected by the reception means;

alarm means for outputting an alarm when the judgement means judges an actual microwave signal to have been received by the reception means; and first control means for suspending the first mixing when the reception means detects a microwave signal having a prescribed frequency;

wherein the judgement of whether or not the prescribed frequency microwave signal detected by the reception means is an actual microwave signal is carried out by the judgement means based on a detected wave output outputted from the reception means after suspension of the first mixing.

2. A double superheterodyne type microwave detector, comprising:

a reception antenna;

a first local oscillator;

a second local oscillator;

reception means for detecting microwaves having prescribed frequencies based on signals obtained by carrying out a first mixing in which the output of the first local oscillator is mixed with the microwaves picked up by the antenna, and a second mixing in which the signals obtained from the first mixing are mixed with the output of the second local oscillator;

judgement means for judging whether or not an actual microwave signal which forms a detection target has been detected by the reception means;

alarm means for outputting an alarm when the judgement means judges an actual microwave signal to have been received by the reception means; and first control means for suspending the first mixing when the reception means detects a microwave signal having a prescribed frequency;

wherein the judgement of whether or not the prescribed frequency microwave signal detected by the reception means is an actual microwave signal is carried out by the judgement means based on information outputted from the reception means after suspension of the first mixing, and information outputted from the reception means before suspension of the first mixing.

3. The double superheterodyne type microwave detector of claim 2, wherein the information outputted from the reception means is in the form of detected wave outputs, and wherein the judgement means judges an actual microwave signal to have been received in the case where a prescribed frequency microwave signal is detected before suspension of the first mixing and no prescribed microwave signals are detected after suspension of the first mixing.

4. The double superheterodyne type microwave detector of claim 2 or claim 3, wherein one of the first and second local oscillators oscillates at a fixed frequency while the other carries out a sweep oscillation, wherein the information outputted from the reception means is in the form of detected wave outputs and signal strengths, and wherein, in the case where microwave signals having a prescribed frequency are detected both before and after suspension of the first mixing, the judgement means judges an actual microwave signal to have been received in the case where the signal strength of the prescribed frequency microwave signals detected after suspension of the first mixing is smaller than the signal strength of the prescribed frequency microwave signals detected before suspension of the first mixing.

5. The double superheterodyne type microwave detector of claim 2 or claim 3, wherein one of the first and second local oscillators oscillates at a fixed frequency while the other carries out a sweep oscillation, wherein the information outputted from the reception means is in the form of detected wave outputs, and wherein, in the case where microwave signals having a prescribed frequency are detected both before and after suspension of the first mixing, the judgement means judges an actual microwave signal to have been received in the case where the number of prescribed frequency microwave signals detected after suspension of the first mixing is smaller than the number prescribed frequency microwave signals detected before suspension of the first mixing.

6. The double superheterodyne type microwave detector of any claims 1~3, wherein one of the first and second local oscillators oscillates at the other carries out a sweep oscillation, and wherein the suspension of the first mixing is carried out during the next cycle after a prescribed frequency microwave signal has been detected.

7. The double superheterodyne type microwave detector of any of claims 1~3, wherein the first local oscillator oscillates at a fixed frequency and the second local oscillator carries out a sweep oscillation, and further comprising:

a second control means for carrying out a repeat sweep in which the sweep of the second local oscillator is returned by a prescribed amount when a prescribed frequency microwave signal is detected;

wherein the suspension of the first mixing by the first control means is carried out immediately after a prescribed frequency microwave signal has been detected, and wherein a judgement of whether or not the prescribed frequency microwave signal detected by the reception means is due to an actual microwave signal is carried out by the judgement means based on a detected wave output outputted from the reception means during suspension of the first mixing by the first control means.

8. The double superheterodyne type microwave detector of any of claims 1~3, wherein the first local oscillator oscillates at a fixed frequency and the second local oscillator carries out a sweep oscillation, and further comprising:

a second control means for carrying out a repeat sweep in which the sweep of the second local oscillator is returned by a prescribed amount when a prescribed frequency microwave signal is detected;

wherein the suspension of the first mixing by the first control means is carried out immediately after a prescribed frequency microwave signal has been detected, and wherein the judgement means judges an actual microwave signal to have been detected when no prescribed frequency microwave signals are detected within a prescribed sweep width after suspension of the first mixing.

9. The double superheterodyne type microwave detector of any claims 1~3, further comprising means for resuming the first mixing after the judgement means judges an actual microwave signal to have been detected, and wherein the judgement means carries out a confirmation judgement in which the detection of an actual microwave signal is confirmed when a prescribed frequency microwave signal is detected after the first mixing is resumed.

* * * * *

UNITED STATES PATENT AND TRADEMARK OFFICE
CERTIFICATE OF CORRECTION

PATENT NO. : 6,137,406
DATED : October 24, 2000
INVENTOR(S) : Ono

It is certified that error appears in the above-identified patent and that said Letters Patent is hereby corrected as shown below:

Column 4,
Lines 33-34, "an microwave" should read -- a microwave --.

Column 10,
Line 12, "value of ox" should read -- value of $\alpha$ --.
Line 30, "jugdement at" should read -- judgement at --.

Column 11,
Line 55, "are judged interference" should read -- are judged to be due to microwave interference --.

Column 12,
Line 10, "amount cc" should read -- amount $\alpha$ --.

Column 16,
Line 11, "oscillates at the" should read -- oscillates at a fixed frequency while the --.

Signed and Sealed this

First Day of April, 2003

JAMES E. ROGAN
*Director of the United States Patent and Trademark Office*